(12) United States Patent
Rasmussen

(10) Patent No.: US 10,765,258 B2
(45) Date of Patent: Sep. 8, 2020

(54) CHIMNEY GRILL STARTER

(71) Applicant: Dennis Rasmussen, Herning (DK)

(72) Inventor: Dennis Rasmussen, Herning (DK)

( * ) Notice: Subject to any disclaimer, the term of this patent is extended or adjusted under 35 U.S.C. 154(b) by 112 days.

(21) Appl. No.: 15/575,428

(22) PCT Filed: May 19, 2016

(86) PCT No.: PCT/EP2016/061305
§ 371 (c)(1),
(2) Date: Nov. 20, 2017

(87) PCT Pub. No.: WO2016/184974
PCT Pub. Date: Nov. 24, 2016

(65) Prior Publication Data
US 2018/0153345 A1    Jun. 7, 2018

(30) Foreign Application Priority Data

May 20, 2015    (DK) .................................. 2015 00067
Mar. 23, 2016   (DK) .................................. 2016 00180

(51) Int. Cl.
| A47J 37/07 | (2006.01) |
| F23B 90/02 | (2011.01) |
| F24B 15/00 | (2006.01) |
| F23Q 13/02 | (2006.01) |

(52) U.S. Cl.
CPC ............ *A47J 37/079* (2013.01); *F23B 90/02* (2013.01); *F23Q 13/02* (2013.01); *F24B 15/005* (2013.01)

(58) Field of Classification Search
CPC ........ F23B 90/02; A47J 37/079; A47J 45/085; F23Q 13/02; F23Q 13/04; F23Q 7/02; F23Q 7/04; F23Q 7/14; F24H 9/06; F24H 9/0057; F24H 3/0417; F24H 3/0423; F24B 15/005
See application file for complete search history.

(56) References Cited

U.S. PATENT DOCUMENTS

| 3,121,408 A | 2/1964 | Bruce |
| 3,374,071 A | 3/1968 | Corriher, Jr. |
| 4,130,103 A | 12/1978 | Zimmerman |
| 4,190,034 A * | 2/1980 | Wonisch ................. F23Q 13/04 126/25 B |
| 4,604,986 A * | 8/1986 | Barnes .................. F24B 15/005 126/25 B |
| 5,154,159 A | 10/1992 | Knafelc |
| 6,009,867 A | 1/2000 | Walton |

(Continued)

FOREIGN PATENT DOCUMENTS

| DE | 102006027862 | * 12/2007 |
| EP | 2272411 | 1/2011 |
| FR | 2403516 | 4/1979 |

*Primary Examiner* — Alfred Basichas
(74) *Attorney, Agent, or Firm* — Morse, Barnes-Brown & Pendleton, P.C.; Sean D. Detweiler, Esq.

(57) ABSTRACT

A chimney starter (1) including a hollow element (2), for receiving a solid fuel product to be ignited, an upper-end (3), a lower-end (4) and a grate (5), the grate (5) is placed across the hollow element (2) in the lower-end (4) of the chimney starter (1), wherein the lower-end (4) of chimney starter (1) rests on a chimney starter base (6) and the chimney starter base (6) comprising a gas burner (7) and one or more means (9) for increasing the air flow through the hollow element (2).

21 Claims, 7 Drawing Sheets

(56) References Cited

U.S. PATENT DOCUMENTS

| | | |
|---|---|---|
| 8,596,258 B1 | 12/2013 | Gonzalez |
| 2004/0154603 A1 | 8/2004 | Crawford |
| 2007/0119444 A1 | 5/2007 | Yoon |
| 2012/0111313 A1 | 5/2012 | Stover |
| 2013/0092146 A1* | 4/2013 | Grob ................ A47J 37/079 126/25 B |
| 2015/0272388 A1* | 10/2015 | Jorgensen ........... A47J 37/079 126/25 B |

* cited by examiner

CHIMNEY GRILL STARTER

BACKGROUND OF THE INVENTION

1. Technical Field

The present invention relates to chimney starter for igniting a solid fuel product. In particular the present invention relates to a chimney starter for igniting briquettes, such as charcoal briquettes, to be used in a grill.

2. Background Art

A chimney starter is a device that is used to set briquettes, such as charcoal briquettes, on fire. Chimney starters were developed to reduce the time for igniting briquettes, such as charcoal.

The most common designs consist of a tubular element having a handle on the side, and in the bottom part and inside the tubular element, there is a grate or a plate with holes. The bottom part of the tubular element may also be provided with venting holes to improve the air supply during ignition.

When using the chimney starter, a solid fuel product, such as charcoal, is filled into the tubular element and stacked on top of the grate or plate. Below the grate or plate, a firelighter is placed or a flammable liquid is poured over the charcoal, and the firelighter or the flammable liquid is then set on fire.

Igniting of the briquettes, such as charcoal briquettes, using such chimney starter is improved by the effect obtained from the chimney draught. Chimney draught comes when, e.g., coal, wood or any other fuel is combusted and the hot combustion product gases that are formed, called flue gases, are exhausted to the ambient outside air through a chimney.

The combustion flue gases inside the chimneys are much hotter than the ambient outside air and therefore less dense than the ambient air. This causes the bottom of the vertical column of hot flue gas to have a lower pressure than the pressure at the bottom of a corresponding column of outside air. That higher pressure outside the chimney is the driving force that moves the required combustion air into the combustion zone and also moves the flue gas up and out of the chimney.

The effect of this chimney draught (i.e., the chimney draught effect) is that air will be drawn into the bottom of the chimney starter and through the charcoal to be ignited and provide improved air supply to the firing process.

The chimney starters traditionally found on the market all involve ignition using firelighters or the flammable liquid which are slow and not very environmentally friendly or they require careful or complex handling.

Hence, an improved chimney starter is desired, which reduces the time spent for igniting the briquettes, such as charcoal briquettes, to provide a more homogenous distribution of the igniting and at the same time do the igniting in a more environmentally friendly manner and which is easy to handle.

SUMMARY OF THE INVENTION

Thus, an object of the present invention relates to a chimney starter for igniting a solid fuel product.

In particular, it is an object of the present invention to provide a chimney starter for igniting briquettes, such as charcoal briquettes, to be used in a grill that solves the above mentioned problems of the prior art with being slow, not being very environmentally friendly or require complex handling.

Thus, one aspect of the invention relates to chimney starter (1) comprising a hollow element (2), for receiving a solid fuel product (15) to be ignited, an upper-end (3), a lower-end (4) and a grate (5), the grate (5) is placed across the hollow element (2) in the lower-end (4) of the chimney starter (1), wherein the lower-end (4) of chimney starter (1) rests on a chimney starter base (6) and the chimney starter base (6) comprising a gas burner (7) and one or more means (9) for increasing the air flow through the hollow element (2).

Another aspect of the present invention relates to a chimney starter comprising at least two individual hollow elements, such as at least three individual hollow elements, or such as at least four individual hollow elements.

A further aspect of the present invention relates to a chimney starter base (6) comprising a chimney starter platform (11) for placing a lower-end (4) of a hollow element (2), the chimney starter base (6) comprises a gas burner (7) and one or more means (9) for increasing the air flow through hollow element (2), when placed on the chimney starter platform (11).

DESCRIPTION OF THE DRAWINGS

Other advantages of the present invention are readily appreciated as the same becomes better understood by reference to the following detailed description when considered in connection with the accompanying drawings wherein.

Figure 1:
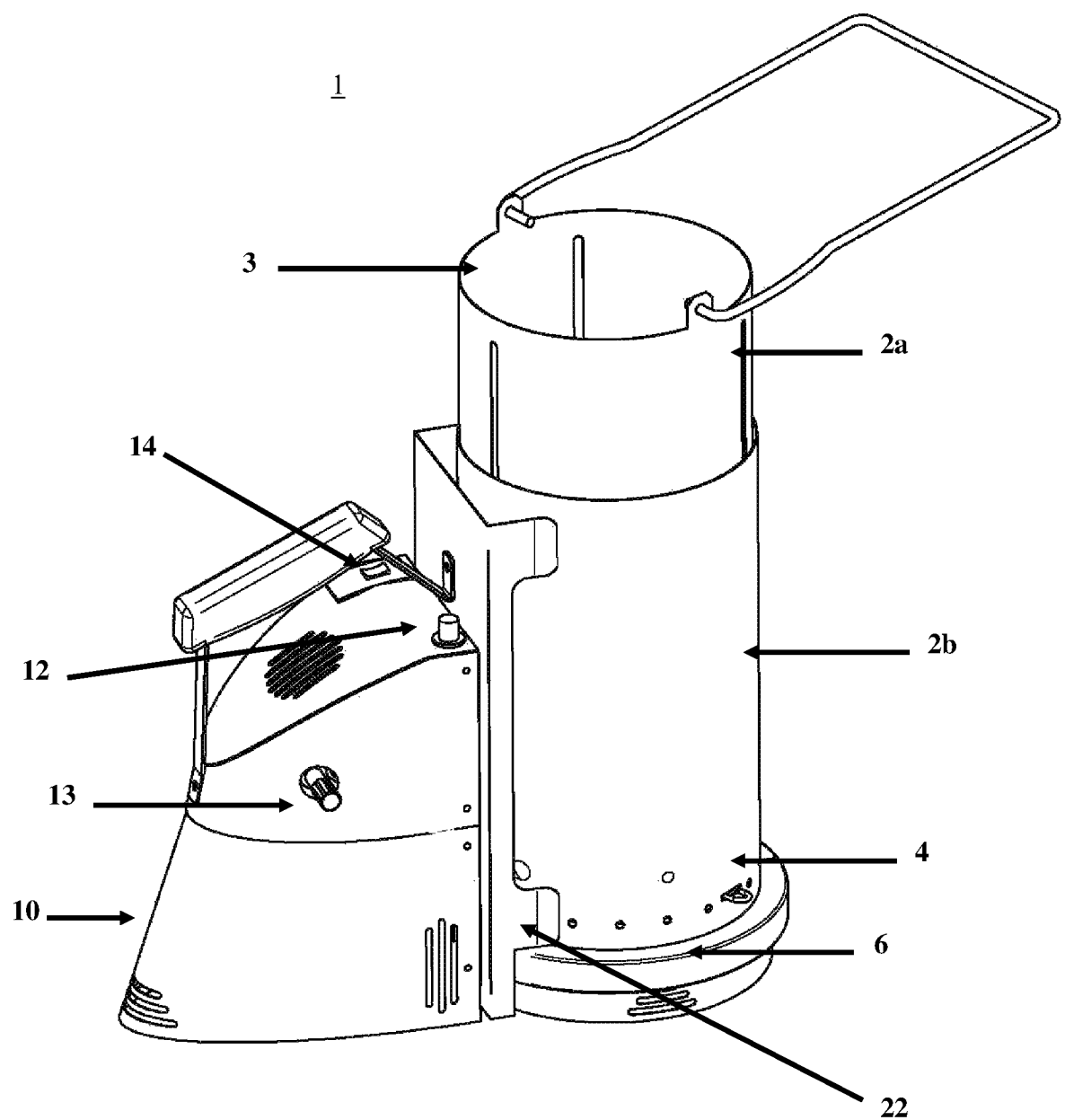
FIG. 1 shows a side-view of a chimney starter (1) according to the present invention. The chimney starter (1) is presented as the telescopic member where the inner hollow member (2a) is placed longitudinally, and is longitudinally movable, relative to the outer hollow element (2b). The hollow element (2) comprises an upper-end (3) for receiving the solid fuel product (not shown) and a lower-end (4) which is placed in the means (22) on the chimney starter base (6) for receiving and/or holding the hollow element. The chimney starter base (6) comprises a control unit (10). The control unit (10) comprises means (13) for regulating the gas flow through the hollow element (2) and/or through a gas burner (not shown); and means (12) for igniting the gas provided by the gas burner (not shown). Said means (12) for igniting the gas may be a piezo ignition or an electronic ignition. The control unit further comprises means (14) for activating and/or regulating the air flow through the hollow element (2), preferably, this air flow may be provided by a fan.
Figure 2:
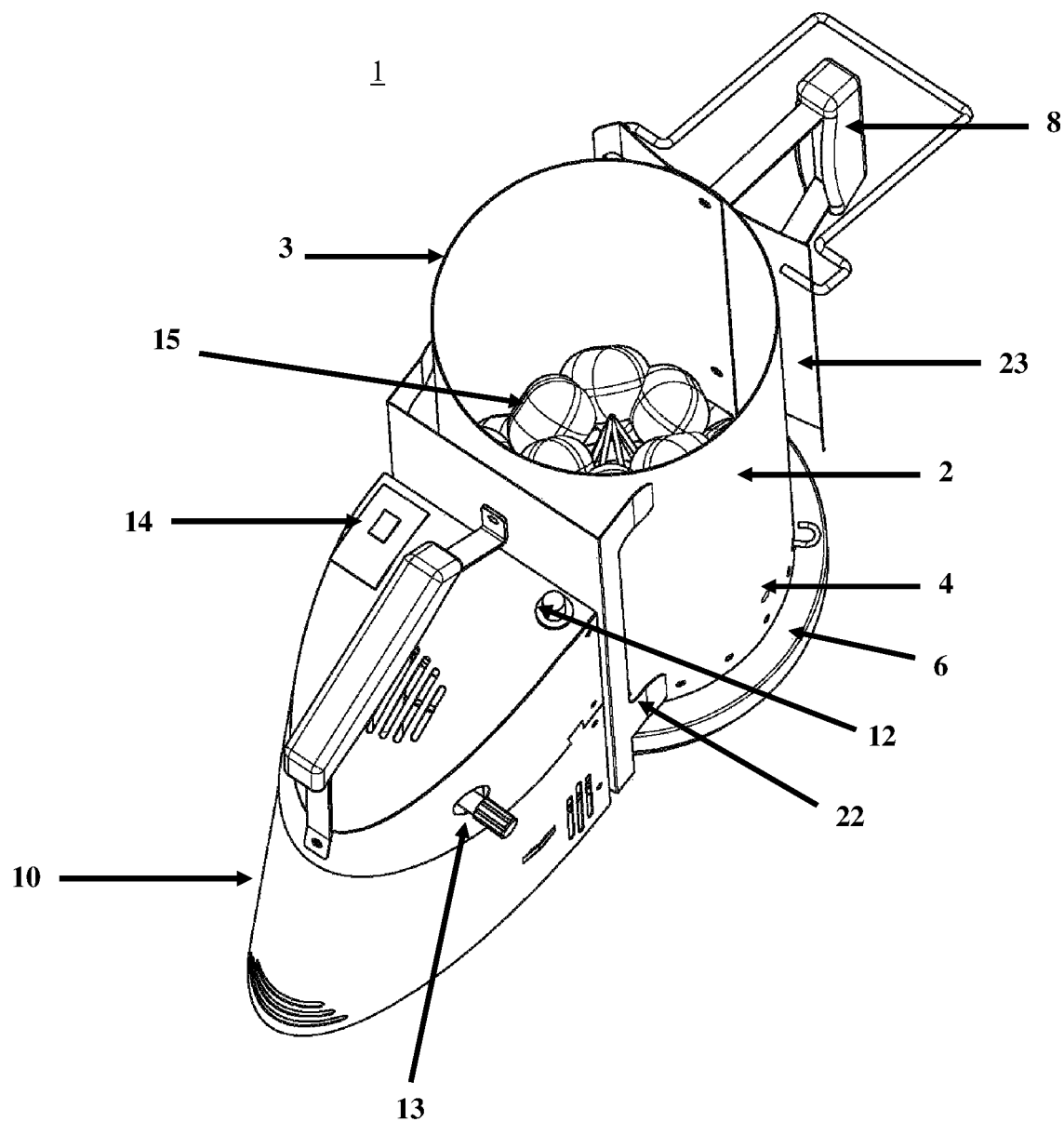
FIG. 2 shows a top-view of a chimney starter (1) according to the present invention. The chimney starter (1) comprises a hollow element (2). The hollow element (2) comprises a third heat protective shield (23) and a handle (8). The hollow element (2) filter comprises an upper-end (3) for receiving the solid fuel product (15) and a lower-end (4) which is placed in the means (22) on the chimney starter base (6) for receiving and/or holding the hollow element (2). The hollow element (2) comprises a solid fuel product (15), such as briquettes. The chimney starter base (6) comprises a control unit (10). The control unit (10) comprises means (13) for regulating the gas flow through the hollow element (2) and/or through a gas burner (not shown); and means (12) for igniting the gas provided by the gas burner (not shown). Said means (12) for igniting the gas may be a piezo ignition or an electronic ignition. The control unit further comprises means
Figure 3:
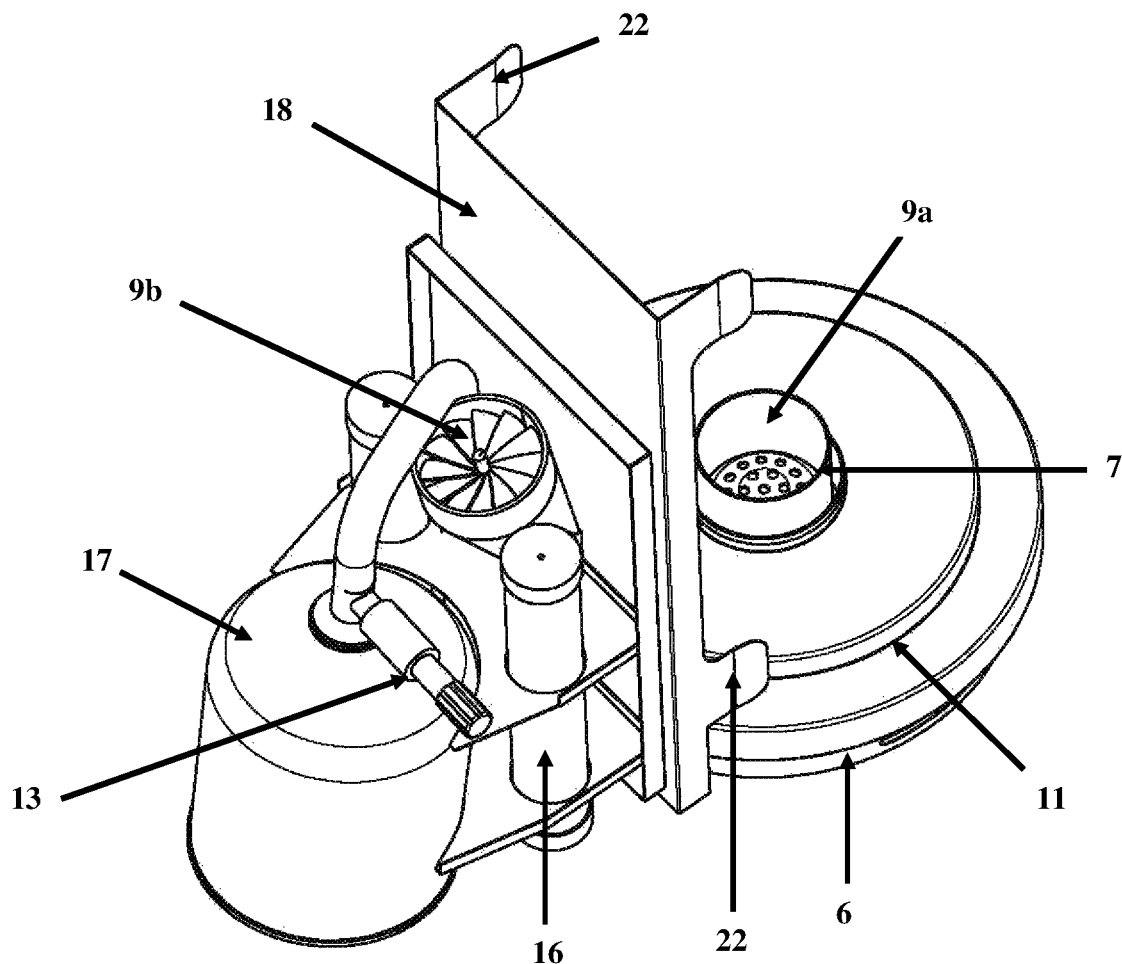
Figure 4:
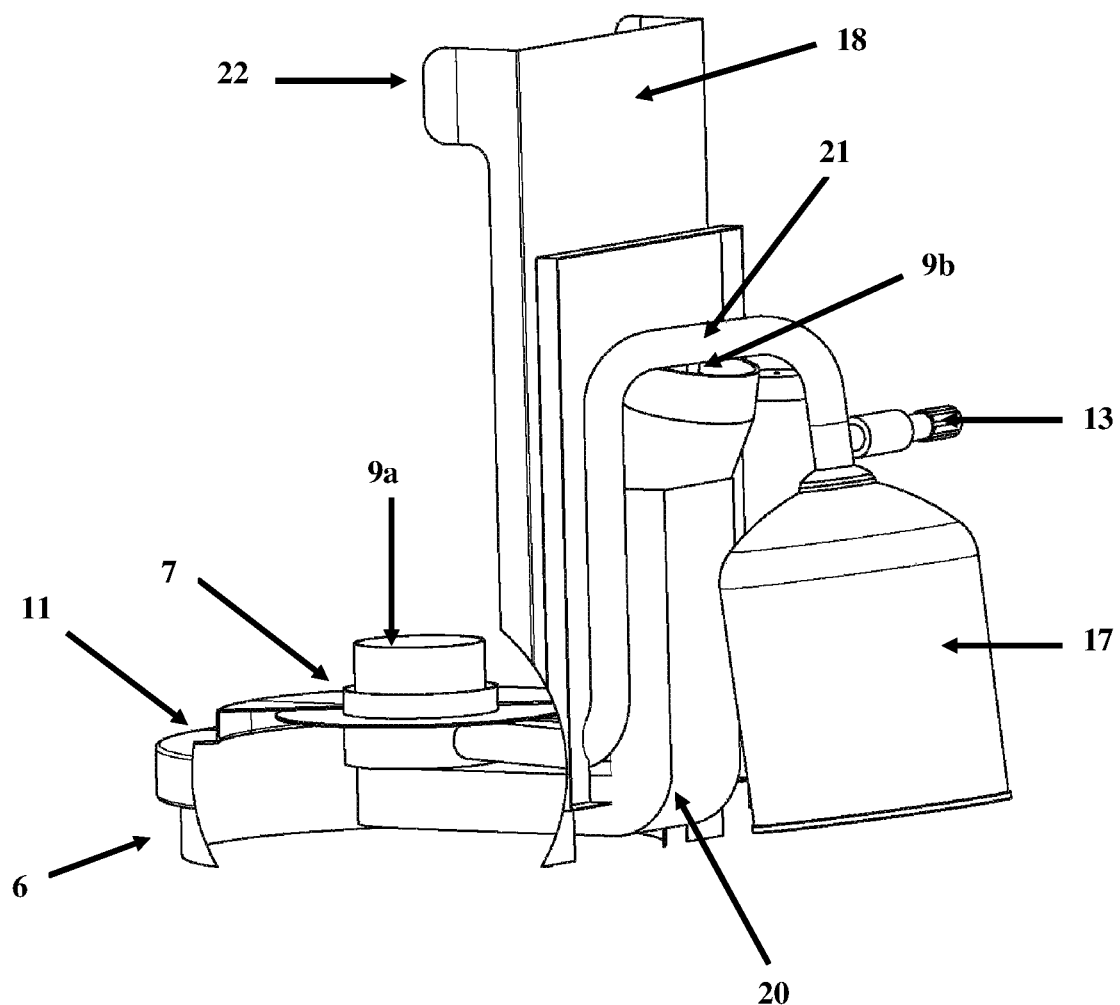
Figure 5:
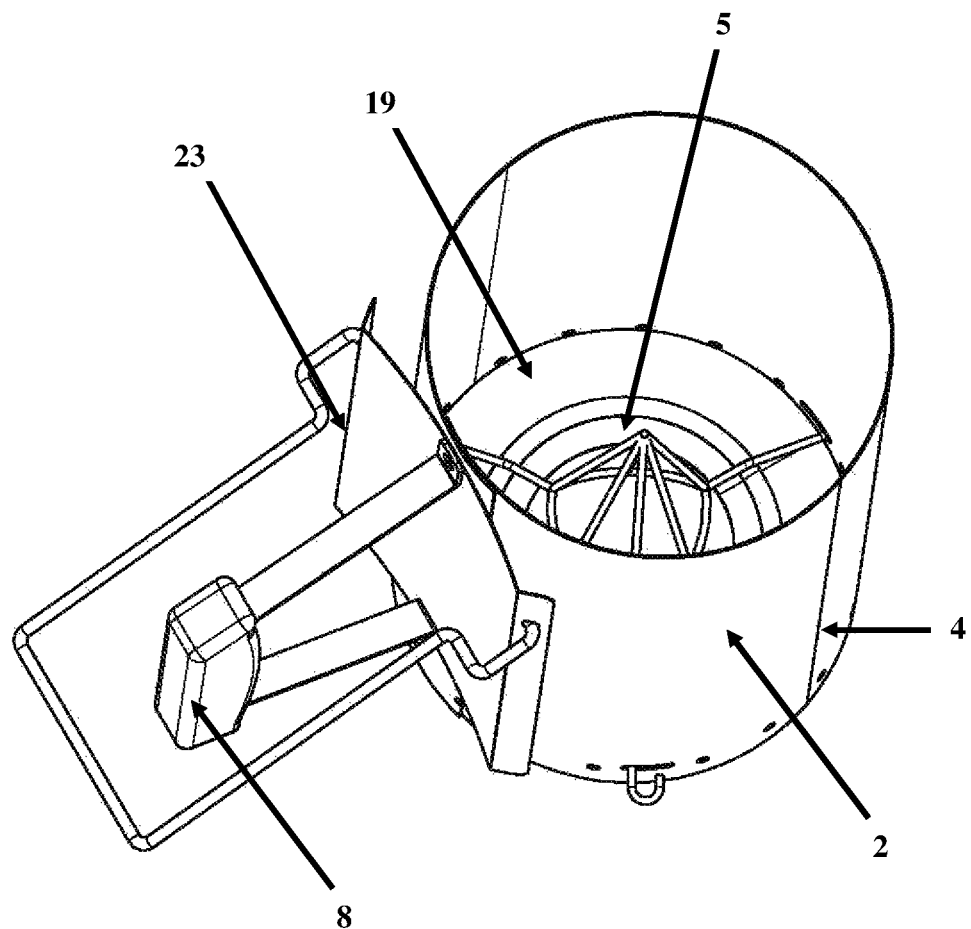
Figure 6:
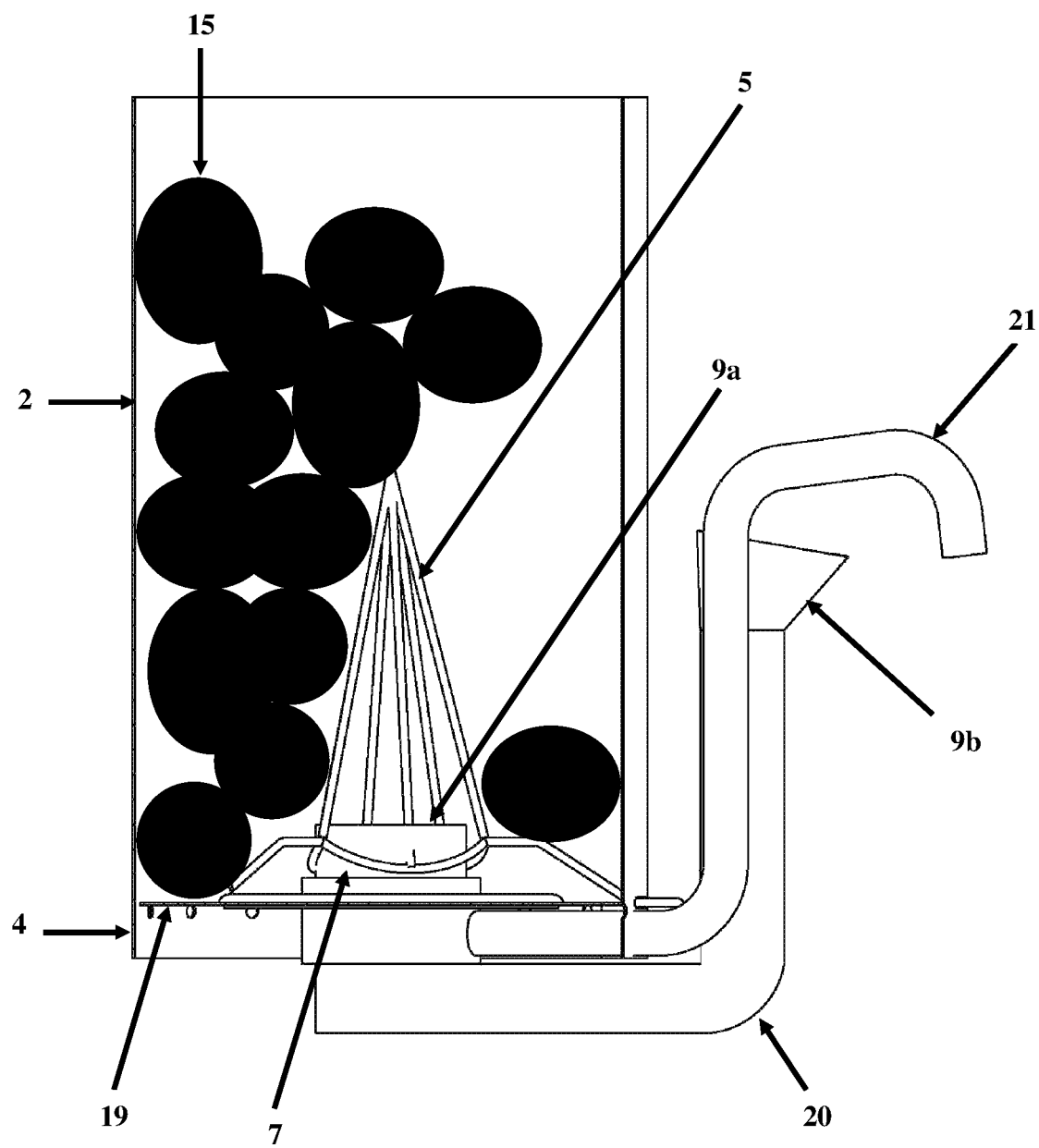
Figure 7:
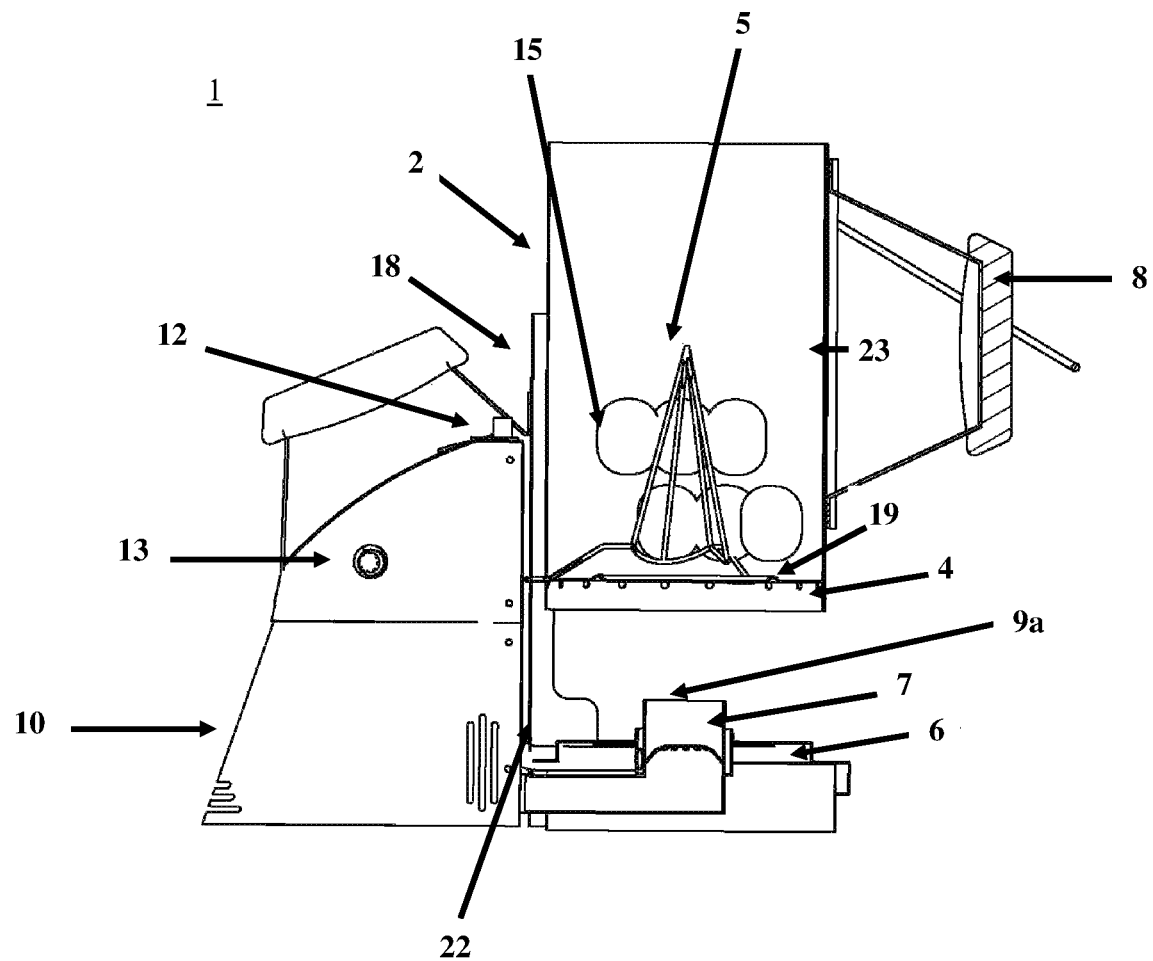

(14) for activating and/or regulating the air flow through the hollow element (2), preferably, this air flow is provided by a fan;

FIG. 3 shows a chimney starter base (6) having a chimney starter platform (11) comprising means (22) for receiving and/or holding the hollow element (2) and a first heat protective shield (18). The chimney starter base (6) comprises a fan (9b) for increasing the air flow though the hollow element (not shown) connected to an air outlet (9a) for releasing the air through the hollow element (not shown); and a battery pack (16) for providing energy to the fan (9b). The chimney starter base (6) further comprises a gas canister (17) and means (13) for regulating the gas flow through the chimney starter (1) and/or through a gas burner (7);

FIG. 4 shows a chimney starter base (6) having a chimney starter platform (11) comprising means (22) for receiving and/or holding the hollow element (2) (not shown) and a first heat protective shield (18). The chimney starter base (6) comprises a fan (9b) for increasing the air flow through the hollow element (not shown) connected to an air outlet (9a) for releasing the air through the hollow element (not shown). The chimney starter base (6) further comprises a gas canister (17) and means (13) for regulating the gas flow through the hollow element (2) and/or through a gas burner (7). During use the gas is transported from the gas canister (17) to the gas burner (7) via the pipe (21) and the air directing means (20) allows the air to move from the means (9b) for increasing the air flow though the hollow element (not shown), e.g., the mechanical means (9b), such as the fan, to the air outlet (9a) for releasing the air through the hollow element of the chimney starter;

FIG. 5 shows a top-view of the hollow element (2). The hollow element (2) comprises a handle (8) and a third heat protective shield (23) and a second heat protection shield (19) placed in the lower-end (4). In the lower-end (4) of the hollow element (2) a grate (5) is placed. The grate is preferably formed as a cone extending upwards into the hollow element (2) improving the contact between the solid fuel product and flame from the gas burner and the air flow;

FIG. 6 shows a side-view through the hollow element (2). The hollow element (2) comprises a solid fuel product (15), such as briquettes, and a second heat protective shield (19) placed in the lower-end (4). In the lower-end (4) of the hollow element (2) a grate (5) is placed. The grate is preferably formed as a cone extending upwards into the hollow element (2) improving the contact between the solid fuel product and flame from the gas burner and the air flow. Preferably, the cone extends vertically through 10% or more of the hollow element (2), such as 20% or more, such as 30% or more, such as 40% or more, such as 50% or more, such as 75% or more, or such as about 100%. During use the gas is transported from the gas canister (not shown) to the gas burner (7) via the pipe (21) and the air directing means (20) allows the air to move from the means (9b) for generating the air flow through the hollow element (2), e.g., the mechanical means (9b), such as the fan, to the air outlet (9a) and through the hollow element (2); and FIG. 7 shows a side-view of the chimney starter (1) and through the hollow element (2). The hollow element (2) comprises a solid fuel product (15), such as briquettes, a first heat protective shield (18) placed between the control unit and the hollow element (2), a second heat protective shield (19) placed in the lower-end (4), and a third heat protective shield (23) placed between a handle (8) and the hollow element (2). In the lower-end (4) of the hollow element (2) a grate (5) may be placed. The grate (5) is preferably formed as a cone extending upwards into the hollow element (2) improving the contact between the solid fuel product (15) and flame from the gas burner (7) and the air flow from the air outlet (9a). Preferably, the cone extends vertical through 10% or more of the hollow element (2), such as 20% or more, such as 30% or more, such as 40% or more, such as 50% or more, such as 75% or more, or such as about 100%. The lower-end (4) is to be placed in means (22) on the chimney starter base (6) for receiving and/or holding the hollow element (2). The chimney starter base (6) comprises a control unit (10). The control unit (10) comprises means (13) for regulating the gas flow through the hollow element (2) and/or through a gas burner (7); and means (12) for igniting the gas provided by the gas burner (7). Said means (12) for igniting the gas may be a piezo ignition or an electronic ignition. The air outlet (9a) provides air flow through the hollow element (2).

DETAILED DESCRIPTION OF THE INVENTION

Traditional chimney starters are provided in many different configurations and common for most of the configurations is an interest in preparing the charcoal or briquettes quickly and at the same time make is easy to use. Traditionally, providers have been unsuccessful in achieving these goals without compromising the environment or the taste of the food, due to soot and smoke from firelighters, subsequently prepared on the grill or the handling of the chimney starter. This may however be achieved by the present invention.

An aspect of the present invention relates to a chimney starter comprising a hollow element, for receiving a solid fuel product to be ignited, an upper-end, a lower-end and a grate, the grate is placed across the hollow element in the lower-end of the chimney starter, wherein the lower-end of chimney starter rests on a chimney starter base and the chimney starter base comprising a gas burner and one or more means for increasing the air flow through the hollow element.

By using gas for igniting the solid fuel product, rather than using firelighters or flammable liquids, the pollution effect of $CO_2$ released and hazardous particles released to the environment during firing, may be significantly reduced.

In an embodiment of the present invention, the pollution effect is reduced to 75% or less relative to the pollution effect when using firelighters or flammable liquids, such as 50% or less, such as 40% or less, such as 30% or less, such as 20% or less.

Furthermore, in order to further reduce the time spent when igniting the solid fuel product, such as briquettes, and/or to reduce the environmental effect the air flow though the hollow element of the chimney starter may be increased. In a preferred embodiment of the present invention the chimney starter base comprises means for increasing the air flow though the hollow element. Preferably, such means for increasing the air flow though the hollow element includes mechanical means for increasing the air flow though the hollow element, such as a fan, and an air outlet for releasing the air through the hollow element of the chimney starter.

Preferably, the air outlet for releasing the air through the hollow element of the chimney starter may be placed below the grate. Furthermore, the air outlet releasing the air through the hollow element of the chimney starter may be placed on the center line through the hollow element and thereby providing a better distribution of the air sent through the chimney starter.

In order to even further improve the air flow, the hollow element may comprise one or more venting holes in the lower-end of the hollow element, and/or one or more venting holes in the upper-end of the hollow element. Preferably, the venting holes have a diameter in the range of 5-40 mm, such as in the range of 10-35 mm, such as in the range of 15-30 mm, or such as in the range of 20-25 mm.

In the present invention the mechanical means for increasing the air flow through the chimney starter comprise air directing means allowing the air to move from the means for increasing the air flow through the hollow element, e.g. the mechanical means, to the air outlet for releasing the air through the hollow element of the chimney starter.

In order to improve the effect of the chimney starter, the gas burner is surrounding the air outlet for releasing the air through the hollow element.

Further improvement may be seen when the air outlet for releasing the air through the hollow element is placed higher than the gas burner.

Preferably, the mechanical means for increasing the air flow through the hollow element may be powered by a battery pack or from a gas generator placed in the chimney starter base.

For safety and handling reasons the hollow element may comprise a handle attached on the side of the hollow element, allowing the user to move the hollow element around when burning hot from the ignited solid fuel product present in the hollow element.

In an embodiment of the present invention, the handle may comprise a material having a lower thermal conductivity than metal to reduce the risk of being burned. Preferably, the material may be selected from heat resistant materials, such as plastics, rubber or wood.

The chimney starter base may comprise a control unit for regulating the air flow and/or the gas burner.

In an embodiment of the present invention the control unit comprises means for regulating the gas flow through the chimney starter and/or the gas burner.

The control unit may preferably comprise means for igniting the gas provided by the gas burner. Said means for igniting the gas may be a piezo ignition or an electronic ignition.

In an embodiment of the present invention, the chimney starter may be provided with a first heat protection shield which may protect the control unit, the battery pack and/or the gas container from being overheated. Furthermore, the chimney starter may be prepared with a third heat protection shield to avoid the handle from being burning hot and to reduce heat radiation.

In an embodiment of the present invention the hollow element comprises a second heat protection shield placed in the lower-end to reduce wear of the chimney starter base.

The lower end of the hollow element comprises a grate. The grate may be in the form of a perforated material, preferably a metal or a ceramic material. In an embodiment of the present invention, the grate, determined at the side of the grate attached to the inside of the hollow element, is placed for example 1 cm above the gas burner, 2 cm above the gas burner, 3 cm above the gas burner, 4 cm above the gas burner, or 5 cm above the gas burner, such as in the range of 1-10 cm above the gas burner, 1-7 cm above the gas burner, such as in the range of 2-5 cm above the gas burner, or such as in the range of 3-4 cm above the gas burner In an embodiment of the present invention the grate may have the form of an arch or a cone pointing upwards, placed approximately along the center-line through the hollow element.

In yet another embodiment of the present invention the arch or cone of the grate extends at least 1 cm above the plane and into the hollow element, preferably at least 2 cm, even more preferably at least 3 cm, even more preferably at least 4 cm, even more preferably at least 6 cm, preferably at least 8 cm, even more preferably at least 10 cm, even more preferably at least 15 cm, even more preferably at least 20 cm.

In an embodiment of the present invention, the hollow element (2) comprises: a) an arch or cone of the grate which extends at least 1 cm above the plane and into the hollow element, preferably at least 2 cm, even more preferably at least 3 cm, even more preferably at least 4 cm, even more preferably at least 6 cm, preferably at least 8 cm, even more preferably at least 10 cm, even more preferably at least 15 cm, even more preferably at least 20 cm; and b) a second heat protective shield (19) has a width that extends at least 1 cm from the side wall of the hollow element, such as at least 3 cm from the side wall of the hollow element, e.g. at least 4 cm from the side wall of the hollow element, such as at least 5 cm from the side wall of the hollow element, e.g. at least 6 cm from the side wall of the hollow element.

In a further embodiment of the present invention the arch or the cone begins to climb from the plane at least 1 cm from the side wall of the hollow element, such as at least 3 cm from the side wall of the hollow element, e.g. at least 4 cm from the side wall of the hollow element, such as at least 5 cm from the side wall of the hollow element, e.g. at least 6 cm from the side wall of the hollow element.

In a preferred embodiment of the present invention the second heat protective shield (19) has a width that extends at least 1 cm from the side wall of the hollow element, such as at least 3 cm from the side wall of the hollow element, e.g. at least 4 cm from the side wall of the hollow element, such as at least 5 cm from the side wall of the hollow element, e.g. at least 6 cm from the side wall of the hollow element.

In order to improve safety and handling of the chimney starter when burning hot, the hollow element may be removable from the chimney starter base when the solid fuel product has been ignited.

In an embodiment of the present invention the chimney starter base comprises means for receiving and/or holding the hollow element. This ensures that the gas burner and the means for increasing the air flow through the hollow element are correctly placed relative to the hollow element to provide the best ignition of the solid fuel product.

The amount of energy used to ignite the solid fuel product may be further reduced by using a telescopic member. This telescopic member allows the hollow element to become longer, when igniting the solid fuel products, or shorter, e.g. for storage, by having sections that slide inside one another and which improves or increases the chimney draught effect.

In an embodiment of the present invention the hollow element comprises at least two individual hollow elements, such as at least three individual hollow elements, or such as at least four individual hollow elements. Preferably, the at least two hollow elements, such as at least three hollow elements, or such as at least four hollow elements are placed longitudinally.

In a further embodiment of the present invention the at least 2 hollow elements, such as at least 3 hollow elements, e.g. at least 4 hollow elements are independently movable providing the telescopic member.

In an embodiment of the present invention the cross-section of the hollow element may be circular, polygonal, or triangular. The cross-sectional shape of the hollow element may preferably fit with the means for receiving and/or holding the hollow element.

Any kind of flammable gas may be provided to the gas burner in order to ignite the solid fuel product. In an embodiment of the present invention the gas provided to the burner may be butane, propane or a combination hereof.

The gas may preferably be contained in a gas canister placed in the chimney starter base. The gas canister may be in fluid communication with the gas burner via the pipe.

In an embodiment of the present invention the chimney starter base comprises a first heat protective shield provided between the hollow element and the gas canister, the battery pack, and/or the control unit.

In an embodiment of the present invention the hollow element (2) may be removable from the chimney starter base (6).

In another embodiment of the present invention the hollow element (2) may be fixed to the chimney starter base (6).

In a further embodiment of the present invention the solid fuel product may be selected from the group consisting of briquettes, charcoal, and wood.

It should be noted that embodiments and features described in the context of one of the aspects of the present invention also apply to the other aspects of the invention.

The invention will now be described in further details in the following non-limiting examples.

Examples

An example was prepared using:
a traditional chimney starter ignited using approximately 35 g fire lighters placed below the grate and
a chimney starter according to the present invention having a diameter of about 185 mm and a height of about 310 mm and a traditional chimney starter, from Weber, having a diameter of about 190 mm and a height of about 306 mm. The level of gas flow was medium and was 205 g/hr, and the level of air flow through the chimney starter was medium too and set at 4.8 m$^3$/h.

Six experiments were performed using about 3 kg briquettes from three different providers were loaded into each of the chimney starters and the ignition was started. The three types of briquettes were two top quality brands, Heat Beads® and Weber, and a lower quality brand, Baker grill briquettes.

The surrounding temperature during testing was −2° C.

The results show that the time to prepare the briquettes was reduced by 50-75%, depending on the quality of the briquettes. The adverse effects on the environment are shown to be reduced by about 75%.

Hence, the present invention provides a chimney starter which at the same time is fast, very environmentally friendly and easy to use.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims, the invention can be practiced otherwise than as specifically described.

What is claimed is:

1. A chimney starter comprising a chimney starter base and a hollow element, for receiving a solid fuel product to be ignited, wherein the hollow element comprises an upper-end, a lower-end and a grate, the grate being placed across the hollow element in the lower-end, wherein the lower-end of the hollow element rests on the chimney starter base and the chimney starter base comprises a gas burner and a pipe transporting gas from a gas source to the gas burner and a second pipe directing air from an air inlet to an air outlet releasing air through the hollow element of the chimney starter, wherein the air outlet is positioned on a center line through the hollow element.

2. The chimney starter according to claim 1, wherein the hollow element comprises a handle attached on the side of the chimney starter.

3. The chimney starter according to claim 1, further including a fan for increasing the airflow through the hollow element connected to the air outlet.

4. The chimney starter according to claim 3, wherein the fan is connected to a battery pack.

5. The chimney starter according to claim 1, wherein the chimney starter comprises one or more venting holes in the lower-end of the hollow element, and/or one or more venting holes in the upper-end of the hollow element.

6. The chimney starter according to claim 1, wherein the air outlet is placed higher than the gas outlet of the gas burner.

7. The chimney starter according to claim 1, wherein the chimney starter base comprises a control unit.

8. The chimney starter according to claim 7, wherein the control unit comprises a gas flow regulator for regulating the gas flow through the hollow element and/or the gas burner.

9. The chimney starter according to claim 8, wherein the control unit comprises an ignition mechanism for igniting the gas provided by the gas burner.

10. The chimney starter according to claim 9, wherein the ignition mechanism is a piezo ignition or an electronic ignition.

11. The chimney starter according to claim 7, wherein the chimney starter base and/or the control unit is configured to receive and hold the hollow element.

12. The chimney starter according to claim 1, wherein the hollow element is removable from the chimney starter base.

13. The chimney starter according to claim 1, wherein the hollow element comprises at least two individual hollow elements.

14. The chimney starter according to claim 13, wherein the at least two hollow elements are placed longitudinally.

15. The chimney starter according to claim 13, wherein the at least two hollow elements are independently movable.

16. The chimney starter according to claim 13, wherein the at least two hollow elements is a telescopic member.

17. The chimney starter according to claim 1, wherein the gas provided to the burner is butane, propane or a combination hereof.

18. The chimney starter according to claim 17, wherein the gas is contained in a gas canister placed in the chimney starter control unit and/or in the chimney starter base.

19. The chimney starter according to claim 18, wherein the gas canister is in fluid communication with the gas burner.

20. The chimney starter according to claim 1, wherein a first heat protecting shield is provided between the hollow element and the gas canister, the battery pack, the control unit and/or the handle.

21. A chimney starter base comprising a platform adapted to receive a lower-end of a hollow element configured to receive a solid fuel product to be ignited, the chimney starter base comprises a pipe transporting gas to a gas burner and a fan and second pipe directing air from an air inlet to an air outlet for increasing the air flow through the hollow element, when placed on the chimney starter platform, wherein the air outlet is positioned on a center line through the hollow element.

* * * * *